(12) United States Patent
Li et al.

(10) Patent No.: US 12,115,478 B2
(45) Date of Patent: Oct. 15, 2024

(54) AEROSOL SEPARATOR FOR SEPARATING AEROSOLS IN A BLOW-BY GAS

(71) Applicants: Liebherr Machines Bulle SA, Bulle (CH); Deere & Company, Moline, IL (US)

(72) Inventors: Zhi Li, Bulle (CH); Domenico Palmisani, Panezza (IT); Kyle D. Redfern, Cedar Falls, IA (US)

(73) Assignees: Liebherr Machines Bulle SA, Bulle (CH); Deere & Company, Moline, IL (US)

(*) Notice: Subject to any disclaimer, the term of this patent is extended or adjusted under 35 U.S.C. 154(b) by 0 days.

(21) Appl. No.: 18/204,660

(22) Filed: Jun. 1, 2023

(65) Prior Publication Data

US 2023/0398479 A1    Dec. 14, 2023

Related U.S. Application Data

(63) Continuation of application No. 17/375,196, filed on Jul. 14, 2021, now Pat. No. 11,717,779.

(30) Foreign Application Priority Data

Jul. 15, 2020    (CH) .................................... 00878/20

(51) Int. Cl.
| | | |
|---|---|---|
| *B01D 45/06* | (2006.01) | |
| *F01M 11/03* | (2006.01) | |
| *F01M 13/04* | (2006.01) | |

(52) U.S. Cl.
CPC ............. *B01D 45/06* (2013.01); *F01M 11/03* (2013.01); *F01M 2011/031* (2013.01); *F01M 13/04* (2013.01); *F01M 2013/0461* (2013.01)

(58) Field of Classification Search
CPC ........ B01D 45/06; B01D 45/08; F01M 11/03; F01M 13/04; F01M 2011/031;
(Continued)

(56) References Cited

U.S. PATENT DOCUMENTS 5,975,065 A * 11/1999 Clauss ............... F01M 13/0416
123/573
6,672,294 B1 * 1/2004 Pirone .................... F01M 13/04
123/572
(Continued)

FOREIGN PATENT DOCUMENTS

CN    106762033 A    5/2017
CN    107489484 A    12/2017
(Continued)

*Primary Examiner* — Yi-Kai Wang
(74) *Attorney, Agent, or Firm* — Dilworth & Barrese, LLP

(57) ABSTRACT

The invention relates to an aerosol separator for separating aerosols in a blow-by gas, which comprises at least one feed opening for feeding a blow-by gas provided with aerosols, an outlet opening for discharging a blow-by gas cleaned of aerosols, at least one outflow opening for releasing aerosols removed from the blow-by gas, and which is arranged between a flow path of the at least one feed opening and the outlet opening, and a plurality of projections for configuring the flow path running from the at least one feed opening to the outflow opening in a meandering manner, in order to decelerate the blow-by gas which enters the feed opening and which is provided with aerosols, in terms of its flow rate. The separator is characterized in that the projections in their end region, around which blow-by gas flows, have a portion with increasing projection width.

25 Claims, 8 Drawing Sheets

(58) Field of Classification Search
CPC ... F01M 2013/0461; F01M 2013/0494; F01M 13/0405; F02B 67/00; F02B 77/04
USPC .......................................................... 55/440
See application file for complete search history.

(56) References Cited

U.S. PATENT DOCUMENTS

| | | | |
|---|---|---|---|
| 2012/0312272 A1* | 12/2012 | Kobayashi ......... | F01M 13/0416 123/196 R |
| 2014/0109533 A1 | 4/2014 | Horiuchi | |
| 2016/0265404 A1 | 9/2016 | Fujii et al. | |
| 2020/0123943 A1* | 4/2020 | Chung ............... | F01M 13/0416 |
| 2021/0207505 A1 | 7/2021 | Takamatsu et al. | |

FOREIGN PATENT DOCUMENTS

| | | | |
|---|---|---|---|
| DE | 1917428 A1 | 10/1969 | |
| DE | 19703771 C1 | 6/1998 | |
| DE | 10 2009 018000 A1 | 12/2010 | |
| DE | 10 2010 027783 A1 | 10/2011 | |
| DE | 102018124476 A1 | 4/2019 | |
| EP | 1067276 A1 | 1/2001 | |
| FR | 2898386 A1 | 9/2007 | |
| JP | S59-22911 U | 2/1984 | |
| JP | S62-116111 U | 7/1987 | |
| WO | 2007075018 A1 | 7/2007 | |
| WO | 2019/230310 A1 | 12/2019 | |

\* cited by examiner

AEROSOL SEPARATOR FOR SEPARATING AEROSOLS IN A BLOW-BY GAS

BACKGROUND OF THE INVENTION

The present invention relates to an aerosol separator for separating aerosols in a blow-by gas.

During the operation of an internal combustion engine, even in the case of undamaged piston rings, a small proportion of the gases located in the combustion chamber flows between the piston and the sleeve and/or between the piston and the piston bore into the crankcase. The partial region of the casing of the combustion chamber, which is formed by the piston and the wall along the piston, is accordingly not perfectly "sealed" but an outflow of so-called blow-by gas is produced in the boundary region of the piston and the cylinder bore and/or the sleeve. This blow-by gas consists of combustion exhaust gas, non-combusted and/or partially combusted fuel and water vapor and in order to avoid an overpressure building up in the crankcase has to be discharged in a controlled manner.

It is a drawback that the blow-by gas contains a small quantity of solid particles in suspension, such as for example rust, and along its flow path through the crankcase the blow-by gas entrains a certain quantity of engine oil which is then present as oil mist, i.e. as additional aerosols, in the blow-by gas.

In the context of the ecological compliance of engine emissions and the exhaust gas regulations, it is no longer possible simply to discharge the blow-by gas, which is additionally contaminated with said aerosols, to the environment. Thus in modern engines it is provided to feed the blow-by gas back to a combustion chamber via the inlet manifold.

Before reaching the inlet manifold, the blow-by gas has to pass through one or more devices which serve for removing and/or separating the aerosols. Aerosols which are not separated may be deposited, for example, in the compressor or in the charge air cooler and lead to corresponding damage. When removing the aerosols, the separation of oil droplets is particularly important since these oil droplets may be converted into so-called engine sludge during combustion, which leads to gradual damage to the engine by the deposits and which in turn may cause premature engine failure. In this case, the cylinder head valves and the fuel injection nozzles are particularly at risk. Moreover, engine sludge which leaves the combustion chamber may lead to damage to the turbine of the exhaust gas turbocharger and/or the exhaust gas post treatment system. In order to avoid such problems, the aerosols, also including the oil droplets forming the oil mist, are separated before introduction into the inlet manifold of the internal combustion engine. In order to minimize a loss of oil, after separation the engine oil present in the blow-by gas is fed back to the engine oil circuit.

The separation of engine oil from the blow-by gas is frequently carried out in this case via two filters which are arranged in succession in terms of flow technology and which are based on different operating principles.

SUMMARY OF THE INVENTION

The present invention relates to the first filter stage, viewed in terms of flow technology, which is denoted as the oil separator or aerosol separator. This is a high-efficiency particulate air filter which is intended to separate as large a proportion as possible of the aerosols entrained in the blow-by gas by means of gravity, so that a blow-by gas thus cleaned, preferably after passing through a second filtration, may be fed to the inlet manifold without at the same time risking a significant burning of oil and without at the same time damaging the internal combustion engine.

Relative to the flow path, the aerosol separator is installed as far as possible directly at the end of the portion of the blow-by gas path at which further engine oil is able enter the blow-by gas. Due to the general constructional space conditions of most internal combustion engines, such a high-efficiency particulate air filter is arranged above the cylinder head and is closed by the cylinder head cover cap. The aforementioned installation location provides, amongst other things, the advantage that the separated engine oil is able to drip due to gravity into the region in which the valve train, which is to be supplied in any case with engine oil, is located.

It is thus the object of the invention to improve the separation rate of an aerosol separator, so that as large a proportion as possible of the aerosols may be separated from the blow-by gas and the oil droplets included therein may be fed back again to the oil circuit.

This is achieved by an aerosol separator which has all of the features herein. By a specifically designed flow path for the blow-by gas and/or an optional, advantageous positioning of the oil outflow openings along the flow path, a very high proportion of the aerosols is separated from the blow-by gas and an efficient return is effected of the separated engine oil into the engine oil circuit. Further advantageous embodiments of the invention are to be found in the description herein.

Accordingly, it is provided that the aerosol separator according to the invention for separating aerosols in a blow-by gas comprises at least one feed opening for feeding a blow-by gas provided with aerosols, an outlet opening for discharging a blow-by gas cleaned of aerosols, at least one outflow opening for releasing aerosols removed from the blow-by gas, and which is arranged between a flow path of the at least one feed opening and the outlet opening, and a plurality of projections for configuring the flow path running from the at least one feed opening to the outflow opening in a meandering manner, in order to decelerate the blow-by gas, which enters the feed opening and which is provided with aerosols, in terms of its flow rate. Moreover, the aerosol separator is characterized in that the projections in their end region, around which blow-by gas flows, have a portion with an increasing projection width.

Alternatively and/or additionally, it may be provided that the aerosol separator according to the invention for separating aerosols in a blow-by gas comprises at least one feed opening for feeding a blow-by gas provided with aerosols, an outlet opening for discharging a blow-by gas cleaned of aerosols, at least one outflow opening for releasing aerosols removed from the blow-by gas, and which is arranged between a flow path of the at least one feed opening and the outlet opening, and a plurality of projections for configuring the flow path running from the at least one feed opening to the outflow opening in a meandering manner, in order to decelerate the blow-by gas, which enters the feed opening and which is provided with aerosols, in terms of its flow rate. Moreover, the aerosol separator is characterized in that the at least one outflow opening is arranged in a serpentine, in particular a curve, i.e. the curve-shaped part of a serpentine of the flow path configured in a meandering manner.

The blow-by gas is introduced into the aerosol separator via the feed opening and guided via a flow path which is configured in a meandering manner and which is provided with at least one outflow opening, the aerosols separated due to gravity being able to flow out from said outflow opening. The gas flow depleted of these aerosols is then conducted via an outlet opening out of the separator.

The meandering configuration of the flow path is achieved by projections which in their end region, around which the blow-by gas flows, have a portion with increasing projection width.

The structure of the aerosol separator producing the meandering deflection of the flow path is also denoted hereinafter as a labyrinth. The projections in this case obstruct a direct flow from the feed opening to the outflow opening so that the typically meandering flow is imposed.

It is clear to the person skilled in the art that a meandering shape within the meaning of the invention also encompasses a zigzag pattern, a saw tooth pattern, a sinusoidal path and the like, as well as a combination thereof.

The meandering shape produced by the projections, in the case of an advantageously designed channel width, leads to an overall deceleration of the introduced flow, i.e. a deceleration of the speed in the main direction of flow from the feed opening to the outflow opening, as well as a substantial avoidance of turbulence. In other words, due to the meandering shape produced by the projections, in the case of an advantageously designed channel width, although an increased flow rate is present in all of the constricted regions, the difference in magnitude from the average flow rate is as small as possible.

In this case, it has proved particularly advantageous if the projections in their end region, around which blow-by gas flows, have a portion with an increasing projection width. This projection shape produces particularly low turbulence so that the aerosols—as far as possible unimpeded by possible turbulence of the flow—due to the prevailing gravity sink down, adhere to the bottom of the separator and may be separated via the outflow opening.

The frequent deflection of the blow-by gas flow leads to a longer section which has to be covered from the feed opening to the outlet opening, so that a longer time period is available for the aerosols to sink down and, as a result, a greater proportion of aerosols are able to sink down along this section.

According to an optional modification of the present invention, it may be provided that the projections in their end region are of rounded shape and preferably taper toward the end thereof in a droplet shape.

As a result, it is ensured that with a deflection of the flow as little turbulence as possible is produced, so that the sinking down of the aerosols in the blow-by gas is not interrupted.

It may also be provided that the plurality of projections in each case have a longitudinal direction running parallel or approximately parallel to one another. By this structure a flow channel which is approximately uniform in its flow cross section is provided, so that it does not result in undesired speed variations of the conducted flow. If constrictions were to be present along the flow path, however, it might lead to a local increase in the flow rate which might hinder the sinking down of the aerosols to the bottom and thus makes this less probable. Additionally, a variation in the speed generally also leads to swirling which hinders the sinking down of the aerosols.

In this case it may be provided that the end region of one respective projection represents the distal third, preferably quarter, preferably fifth thereof, of the total length of the associated projection.

Each projection leads from a wall element and results in a deflection of the flow path in the meandering shape already described above. The end around which the flow flows, i.e. the end of the projection protruding from the wall, in its end region remote from the wall has a widening diameter which in an optional embodiment results in a droplet-like design of the end region in a sectional view of the projection.

According to a preferred embodiment of the present invention, it may be provided that the plurality of projections are not located perpendicular relative to a resultant of the meandering direction of flow of the flow path and/or a longitudinal direction of the separator, but preferably enclose therewith an acute angle which is preferably between 90° and 45°.

The direction of extension of the meander runs substantially parallel to the longitudinal direction of the separator. The projections creating the meander, however, are preferably not arranged perpendicular to the longitudinal direction of the separator, but run obliquely thereto, wherein preferably they enclose an angle with the longitudinal direction of the aerosol separator and/or the direction of extension of the meander which is between 90° and 45°, preferably between 90° and 70°.

According to the invention, it may also be provided that the aerosol separator has a substantially elongated basic structure and on its two opposing wide sides in each case has a feed opening which in each case lead to the outflow opening arranged in the longitudinal direction in the central third, preferably in the central fifth, via a flow path which is configured in a meandering manner by projections.

Accordingly, overall there are two flow paths configured in a meandering manner, each thereof leading from one of the two feed openings to the outflow opening. From there, the flow path may extend along a single flow channel to the outlet opening, at which the blow-by gas which is as free as possible of aerosols is discharged.

In this case, it may also be provided that the two flow paths leading from opposing wide sides to the outflow opening have in each case a plurality of projections, each of the two flow paths has a plurality of projections, the respective longitudinal directions thereof running parallel or approximately parallel to one another, and the projections of the two flow paths are not oriented parallel to one another. Preferably, it may be provided that the projections of the two flow paths enclose an angle in the range of 40°-15°, preferably 35°-25°.

According to an optional development, in this case the projections are inclined in each case toward their respective feed openings such that the flow path toward the outflow opening is lengthened in order to promote the sinking down of aerosols along the flow path.

According to a development of the invention, it may be provided that parts of the space through which the blow-by gas flows, or the entire space through which the blow-by gas flows, in the aerosol separator is delimited by a surface without edges, preferably with tangential continuity. Preferably, the part of the flow path which is configured in a meandering manner is delimited by a surface without edges, preferably with tangential continuity.

Additionally according to a further modification of the invention, it may be provided that parts of the space through which the blow-by gas flows, or the entire space through which the blow-by gas flows, in the aerosol separator is delimited by a surface which has a rough surface in order to promote the adhesion of aerosols, wherein preferably the projections are provided with a rough surface contour. Additionally or alternatively, the part of the flow path which is configured in a meandering manner may be defined by a space which has a rough surface contour.

It may further be provided that the flow path which is configured in a meandering manner by the projections from the feed opening to the outflow opening has a height which is approximately constant, i.e. decreases from a maximum height by less than 10%, preferably by less than 5%.

By maintaining a constant height the formation of vertical swirling, which is particularly disadvantageous for the sinking down of aerosols, is avoided. If the height of the flow channel is varied, this may lead to swirling in the vertical direction of the separator which may even lead to the aerosols rising in the blow-by gas.

According to an optional modification of the present invention, it may be provided that the aerosol separator is inclined about the axis of its longitudinal extent. Moreover, to this end the outflow opening or a plurality of outflow openings may be arranged in a deeper region of the obliquely positioned separator, in order to facilitate an inflow of collected aerosols flowing on a bottom region.

It may be additionally provided that at least one outflow opening is arranged downstream of the flow path which is shaped in a meandering manner and, alternatively or additionally, at least one outflow opening is arranged in one or more curves of the meandering flow path. In this case, therefore, the outflow opening is arranged in a curve of a serpentine of the meander, since here the flow conditions are advantageous for producing swirl-like flows, so that aerosols drop down in a particularly effective manner in such a swirl.

The separator accordingly has a bottom surface which is rotated about the longitudinal direction or an axis parallel thereto, so that one of the longitudinal sides of the separator is located deeper than the opposing longitudinal side of the aerosol separator. Such an oblique position of the aerosol separator and/or an oblique position of the bottom surface of the aerosol separator, with the deposit of oil droplets on the bottom surface, leads to a flowing movement to the deeper longitudinal side. Relative to solid particle aerosols, such as for example rust particles, after reaching the bottom surface these solid particle aerosols may be entrained by the progressively collecting oil and the outflow thereof to the deeper longitudinal side. Accordingly, it may be advantageous to position the outflow opening close to the deeper longitudinal side, since the aerosols located on the bottom flow toward the outflow opening and/or are entrained there due to gravity. Since the meander formed by the projections extends parallel to the longitudinal direction, the apex points of the meandering shape are located either close to the deeper longitudinal side or close to the higher longitudinal side. This leads to the aerosol particles flowing toward those curves of the meander which are arranged on the deeper longitudinal side. Thus it may be advantageous if a further outflow opening is arranged in at least one of the curves of the meander, said outflow opening being arranged close to the deeper longitudinal end of a serpentine of the meander or at such a longitudinal end.

According to a further advantageous modification, it may be provided that the at least one outflow opening is arranged in an apex region of the flow path which is configured in a meandering manner and/or is arranged downstream of the meandering flow path just upstream of the outlet opening, and/or the at least one outflow opening is arranged in a recess provided for the remainder of the flow path from the feed opening to the outlet opening and/or the at least one outflow opening is arranged in a region of the flow path which is characterized by a particularly low flow rate of a blow-by gas flowing through the aerosol separator, i.e. it has a flow rate which belongs to the slowest third, preferably the slowest quarter, of the flow rates and/or the at least one outflow opening is arranged in a region of the aerosol separator in which partial flows coming locally from different directions coincide and/or the at least one outflow opening is arranged in a bottom region of the aerosol separator which preferably penetrates the base plate of the separator via a bore.

Preferably, at least one non-return valve which covers one respective outflow opening is provided in order to prevent the aerosols, which are actually flowing away, from flowing back into the aerosol separator counter to the originally provided outflow direction and/or to prevent the aerosols from being able to pass from the cavity located below the aerosol separator via an outflow opening into the aerosol separator. In this case these non-return valves may be shield valves which prevent a direction of flow of aerosols and vapors and/or gases into the aerosol separator.

It may be further provided according to a variant of the invention that an outflow opening may comprise a plurality of bores through the lower part of the separator which are all covered by a common non-return valve.

According to a further optional development of the invention, it may be provided that the channel width and thus the cross section of the flow path or the flow paths in the regions between the projection ends and the wall region, respectively opposing the end of the projection, is significantly larger than between the two adjacent projections.

It may further be provided according to a variant of the invention that at least one outflow opening is arranged in one or more serpentines—in particular in curved portions—of the meandering flow path or the meandering flow paths, said outflow opening always being arranged relative to the main direction of flow along the two flow paths 5 upstream of the apex points of one respective serpentine and/or curve.

The invention further relates to an internal combustion engine having an aerosol separator for separating aerosols in a blow-by gas as claimed in at least one of the preceding claims, wherein preferably the aerosol separator is arranged above the cylinder head bank and/or is located below the cylinder head cover.

BRIEF DESCRIPTION OF THE DRAWINGS

Further advantages, features and details of the invention may be derived from the following description of the figures, in which.

DESCRIPTION OF THE PREFERRED EMBODIMENTS

Figure 1:
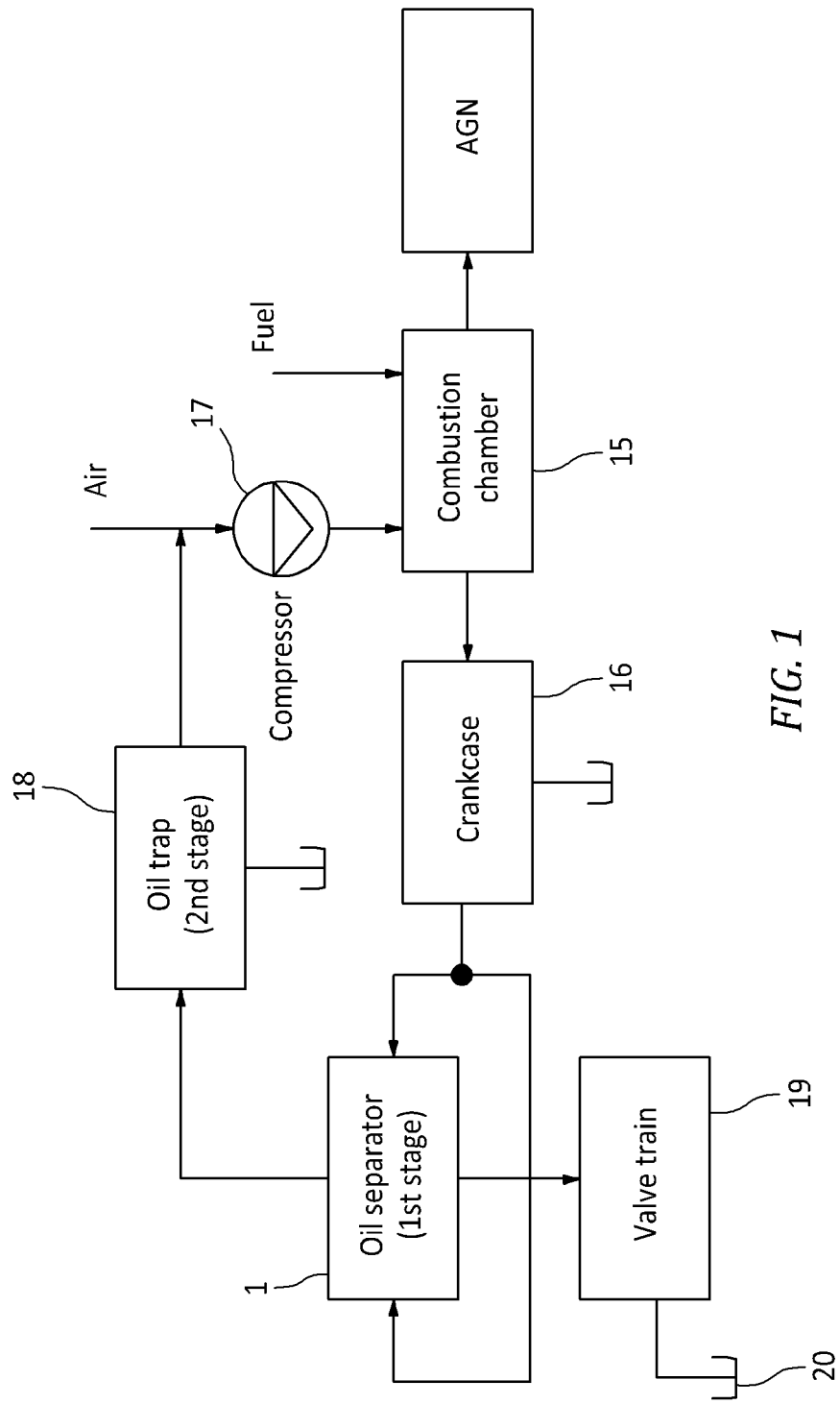
FIG. 1: shows a block diagram for explaining the arrangement of the aerosol separator in an internal combustion engine.

FIG. 1 shows in an exemplary embodiment a block diagram for arranging the aerosol separator which, for example, may be used in a single-stage turbocharged diesel engine designed as an in-line engine, the valve train thereof being located above the cylinder heads and/or above the cylinder head bank.

The so-called blow-by gas passes out of the combustion chamber 15 into the crankcase 16 and entrains oil droplets. So that the blow-by gas may be fed back to the combustion chamber 15, as required, it has to pass to the low pressure side of the compressor 17. In order to avoid that aerosols located in the blow-by gas (oil droplets and solid particles) are fed into the air path, which would lead to the drawbacks already listed above, the blow-by gas is conducted via a two-stage filtration—denoted below as an aerosol separator 1 (and/or oil separator) and oil trap 18. Due to current high power densities of internal combustion engines, the provision of a sufficiently large flow cross section for the path of the blow-by gas in the restricted constructional space also has to be particularly taken into account. Therefore, in a preferred embodiment of the aerosol separator 1 according to the invention a feed of blow-by gas on both sides is provided. In its preferred arrangement in the internal combustion engine 14, the engine oil separated in the aerosol separator 1 drips directly into the cavity above the cylinder head in which the valve train 19 is located.

In the known manner, the valve train 19 is a functional assembly which has a high requirement for oil lubrication, which is why there is a relatively high return flow of engine oil from the valve train into the oil sump 20. As a result, other solid particle aerosols, such as for example rust, which are separated from the blow-by gas in the aerosol separator 1, also ultimately pass at least substantially into the oil sump 20 and are deposited on the bottom thereof or in the oil filter.

From the aerosol separator 1 the aerosols which have reached the bottom thereof flow via an outflow opening into the cavity accommodating the valve train 19 and may flow away from there to the oil sump.

The filtered blow-by gas is conducted from the aerosol separator 1 via the oil trap 18 to the suction side of the compressor 17 from where it then passes again into a combustion chamber 15.

Figure 2:
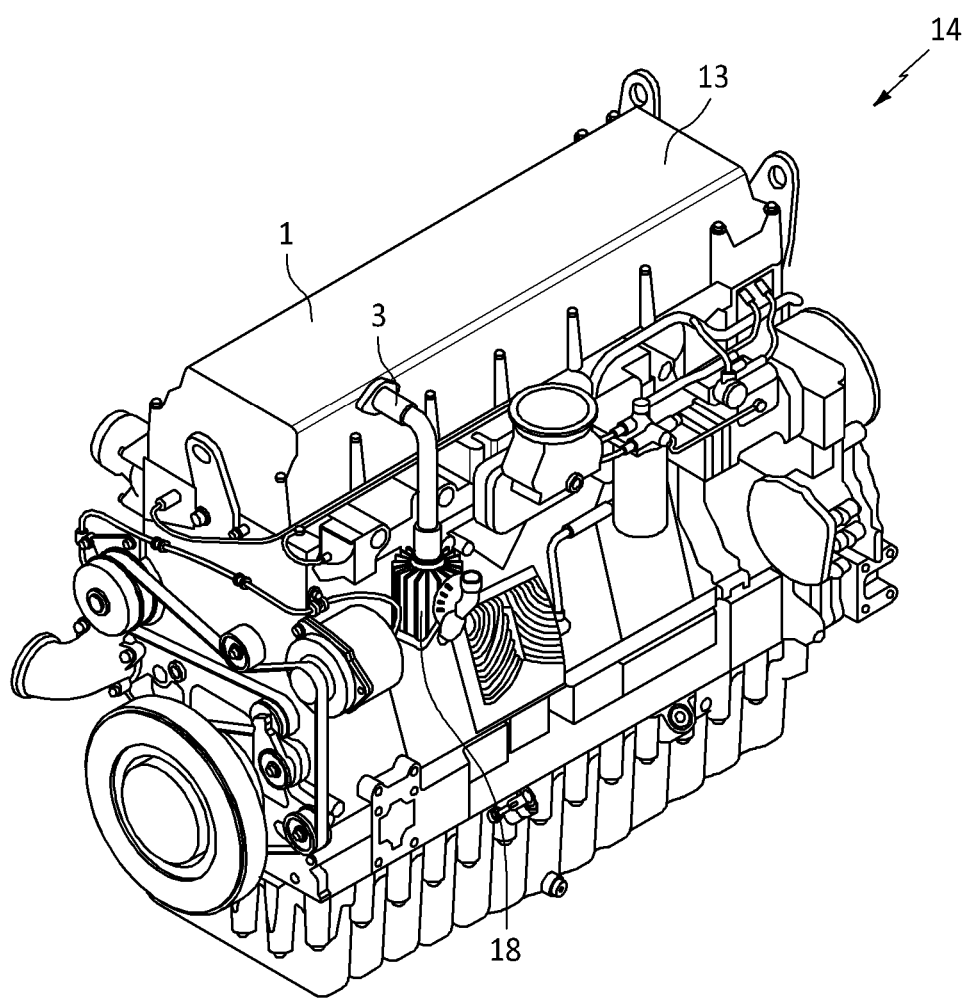
FIG. 2: shows a perspective view of an internal combustion engine with an aerosol separator integrated in the cylinder head cover according to the invention.

FIG. 2 shows a perspective view of an internal combustion engine 14 in which an aerosol separator 1 is integrated below the cylinder head cover 13 thereof. It is possible to identify the outlet opening 3 from which cleaned blow-by gas is conducted and fed to the oil trap 18 arranged downstream.

Figure 3:
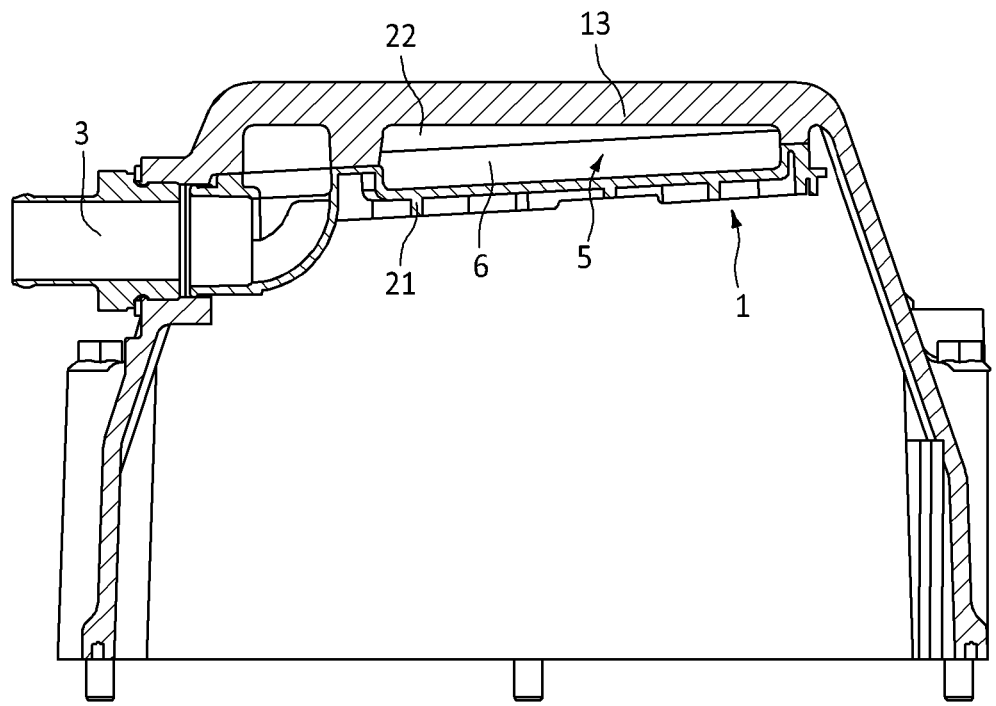
FIG. 3: shows a sectional view of a cylinder head cover with the aerosol separator according to the invention.

FIG. 3 is a sectional view of the cylinder head cover 13, the aerosol separator 1 being arranged in the upper region thereof.

The main components of such an aerosol separator 1 in one possible embodiment are a trough-shaped lower part 21 and a trough-shaped upper part 22. The guide walls for the blow-by gas may thus be designed in each case mirror-symmetrically and equal to one another in the lower part 21 and in the upper part 22, so that a fastening of the two components to one another produces the desired meandering flow channel. According to the basic idea of the invention, however, it is also possible that the flow walls are entirely located in the lower part 21 so that the upper face thereof bears directly and/or indirectly via a seal against an upper part 22 which is shaped in a planar manner.

If the lower part 21 and the upper part 22 are connected together—apart from the at least one feed opening for the blow-by gas inlet, the outlet opening 3 provided for the blow-by gas and the at least one oil outflow opening 4—the cavity serving as a flow channel 5 between the lower part 21 and the upper part 22, which may be aptly denoted as a labyrinth, is closed relative to the outside.

In a specific embodiment, it is possible to configure the upper part 22 in the cylinder head cover 13.

As already indicated in FIG. 1, starting from the interior of the crankcase, two feed openings 2 which permit an entry of blow-by gas into the aerosol separator 1 are present. The presence of two feed openings is not essential to the invention but advantageous since the relevant dimensions and the maximum power of the internal combustion engine 14 are proportional to one another, whereby a division of the flow of the blow-by gas is more expedient, although as a result the flow path in the labyrinth is shortened.

In FIG. 3 it is further identified that the upper part 21 is not oriented horizontally, but—with a normal orientation of the separator—is inclined obliquely to a horizontal. This results in the aerosols, which have sunk down onto the bottom, flowing down and/or being entrained to the deepest point of the bottom, where preferably an outflow opening 4 is arranged.

Figure 4A:
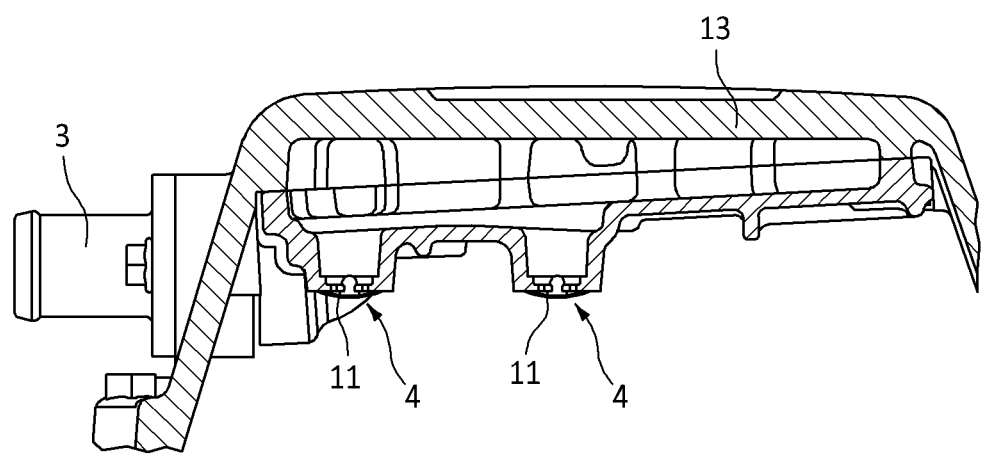
FIG. 4*a*: shows a sectional view of the aerosol separator arranged in the cylinder head cover.

FIG. 4a shows two such outflow openings 4 which are arranged offset to one another in the width direction. In this case each of the outflow openings 4 is arranged in a recess 10 provided in the bottom region of the aerosol separator 1, so that a certain quantity of aerosols may also be collected in the recesses.

The outflow openings 4 are additionally provided in each case with a one-way valve 11 which ensures that no aerosols pass through the outflow openings 4 into the interior of the aerosol separator. Such a one-way valve 11 permits only the outflow of oil droplets from the aerosol separator 1. The same applies to the entrainment of solid particle aerosols.

The lower part 21 and/or the upper part 22 may be produced as a cast part, for example from an aluminum alloy. Alternatively, a production from plastics material is also possible. Similarly, a production by means of 3D printing and/or by means of a method which may be considered under the collective term "additive manufacturing" is possible.

Figure 4B:
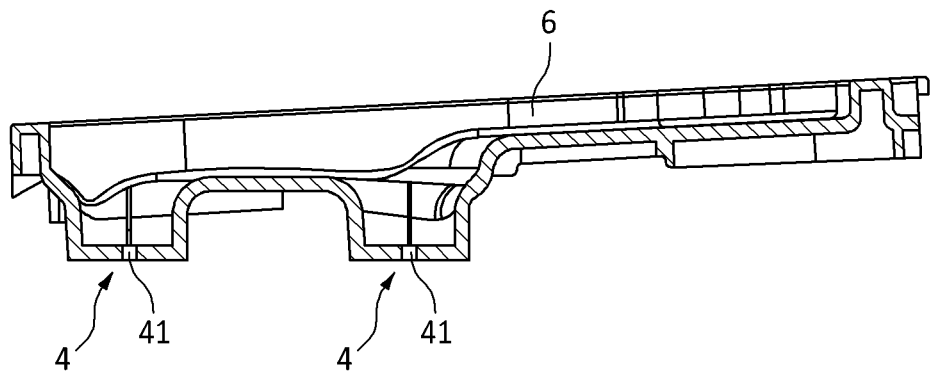
FIG. 4*b*: shows a sectional view of the aerosol separator arranged in the cylinder head cover without valves in the outflow openings.

FIG. 4b shows the illustration of FIG. 4a without the valves 11. It is possible to identify that the outflow openings 4 may be implemented by bores 41.

Figure 5A:
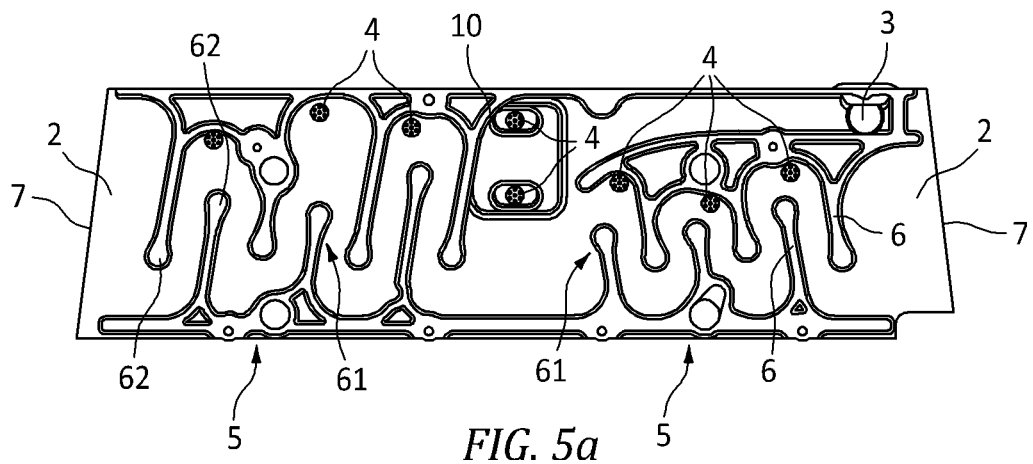
FIG. 5*a*: shows a plan view of the base plate of the aerosol separator according to the invention.

FIG. 5a shows a perspective view of the lower part 21 of the separator 1. As may be derived from this figure, accordingly in each case a feed opening 2 for the inflow of blow-by gas is present on the two wide sides of the separator basic structure 7. The feed openings 2 and the portions of the flow path respectively in the vicinity thereof have a relatively large cross-sectional surface.

Therefore, in each case a flow path 5 formed by projections 6 is present downstream, said flow path conducting the blow-by gas along a channel with a significantly smaller width. Particularly striking is the meandering path of the flow paths 5, which in each case extends from the feed opening 2 to the outflow openings 4 arranged in the recess 10.

Located approximately in the center of the aerosol separator 1 is a volume portion in which the two flow paths 5 moving toward one another coincide. From there a common outlet path leads to the outlet opening 3, from where the blow-by gas leaves the aerosol separator 1, in order from there to reach the oil trap 18 in a second filtering stage which, however, is no longer a component of the present invention.

Said volume portion, in which the flow paths running toward one another 5 coincide, provides the blow-by gas flow with a significantly larger transverse width and thus a significantly larger cross-sectional surface relative to its main direction of flow.

As may be identified, no congruent serpentines are present in the labyrinth according to FIG. 5*a* along the flow path 5. The reason for this is that in the exemplary embodiments it is a subassembly which may be integrated in the internal combustion engine 14 and a plurality of other restrictions in terms of constructional technology have to be taken into account.

Thus the remaining length and width dimensions of the cylinder head bank 12 limit the surface of the labyrinth along which the flow paths 5 for the blow-by gas are able to extend inside the aerosol separator 1. Added to this is the surface area requirement for the outlet 3 of the blow-by gas and specific partial regions which due to screw connections are not available for forming the flow path 5. Nevertheless, the entire portion in which the flow path 5 has a meandering characteristic has common features.

Thus it is possible to identify that the projections 6 at their distal end region 61 have a portion 62 with an increasing projection width and in this exemplary embodiment taper in an approximately droplet-shaped manner.

It is also possible to identify that the orientation of the projections 6 of the flow paths 5 running toward one another is not identical but diverges. The orientation of the projections is in each case rotated relative to the associated wide side 7 so that as a whole a slightly longer flow path 5 is produced through which the blow-by gas has to flow before it reaches the combined region of the two flow paths 5 arranged approximately centrally, than might be the case without a rotation of the orientation of the projections.

The lower part 21 of the aerosol separator 1 may additionally be inclined toward one of the longitudinal sides and in such an embodiment is inclined about the longitudinal axis or an axis parallel thereto. In this case, the inclination of the lower part 1 may lead to the aerosols, which have sunk down to the bottom thereof, flowing down to the deeper longitudinal side and/or being entrained there. In this case, the outflow openings 4 are preferably arranged closer to the longitudinal side toward which the aerosols move due to gravity. Additionally, as may be derived from FIG. 5*a*, it may also be provided that outflow openings 4 are provided not only in the combined region of the two flow paths 5 running toward one another, but also in the curve portions and/or apex portions of the respective flow paths 5. Preferably, this naturally takes place on those curve portions and/or apex portions which due to the inclination are closer to the deeper longitudinal side of the bottom of the lower part.

Figure 5B:
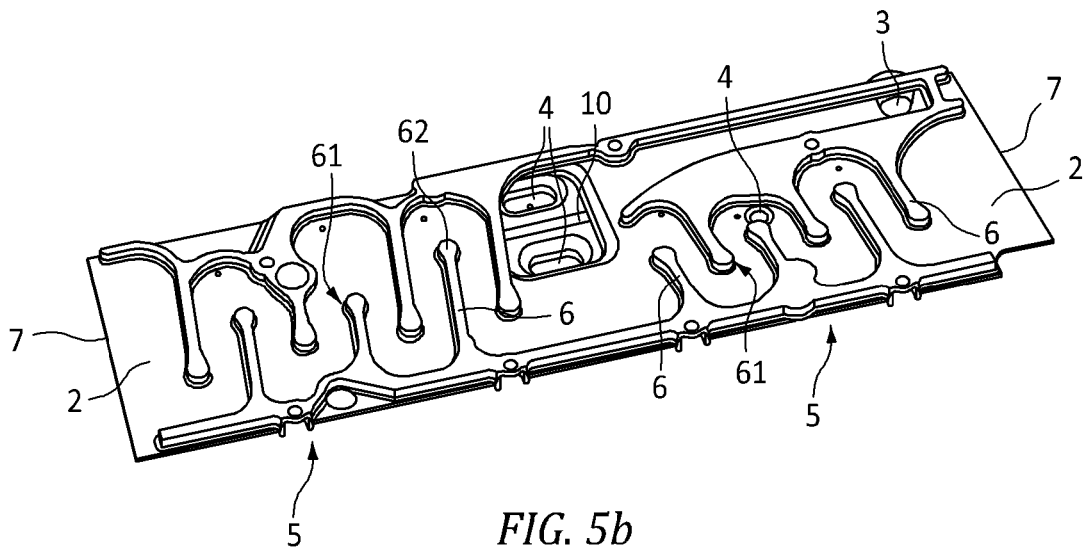
FIG. 5*b*: shows a perspective view of the base plate of the aerosol separator.

FIG. 5*b* shows a further embodiment of the lower part 21 of the separator 1 in a perspective view. It is possible to identify the same structures as in FIG. 5*a*.

Figure 6:
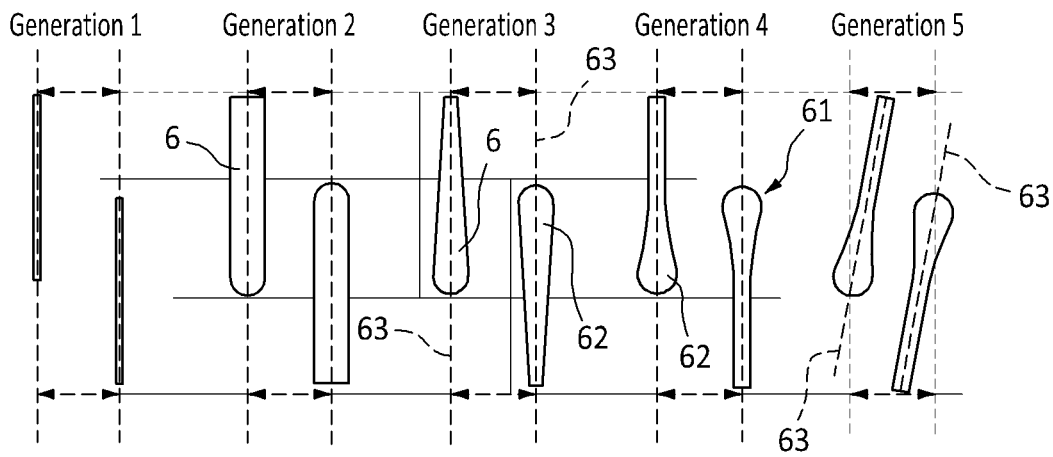
FIG. 6: shows a view of the various development stages of the projections of the aerosol separator.

FIG. 6 shows the plan view of different development stages of the projections 6 from which the meandering flow path 5 may be formed.

In the 2nd generation slightly thicker projections which are designed to be rounded at their distal end have been produced from the thin-walled projections with angular ends. In the 3rd generation the projections 6 have the shape of a club, wherein the rounded end from the 2nd generation has been maintained. The diameter of the projections slowly widens toward the end before it transitions into a rounded end. The 4th generation thus has the droplet-shaped tapering of the projections in which the cross section is initially uniform and a widening, which has approximately the shape of a tapering droplet, is present only toward the end. The 5th generation is based on the 4th generation and thus the rotation of the longitudinal direction of the projections increases further, whereby the total length of the flow path rises, wherein this advantage is not obtained by a narrowing of the flow cross section.

Figure 7A:
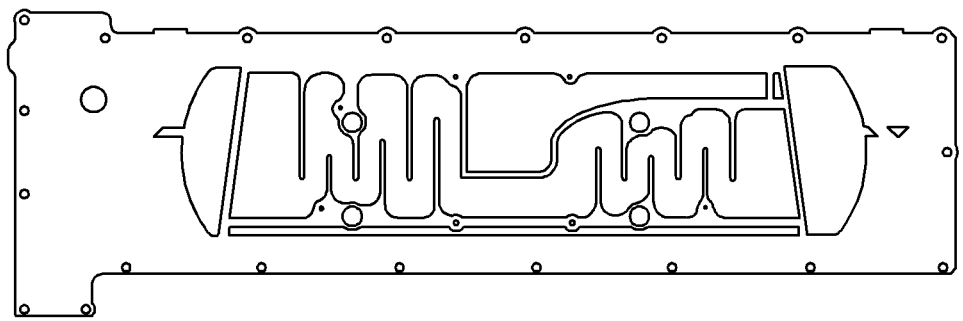
FIG. 7*a*: shows a plan view of the base plate of an aerosol separator with projections according to generation 1.
Figure 7B:
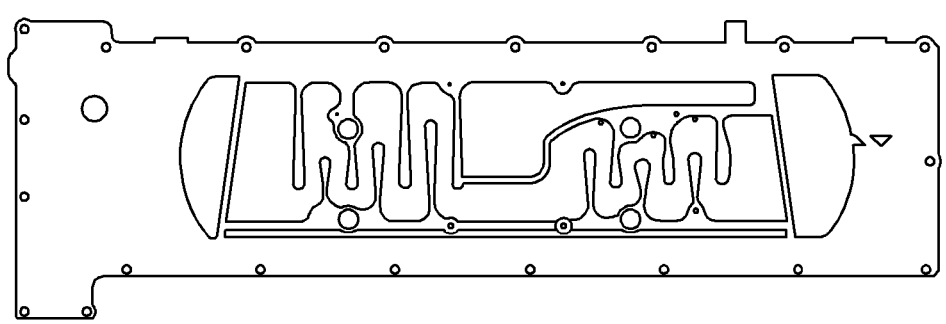
FIG. 7b: shows a plan view of the base plate of an aerosol separator with projections according to generation 3.
Figure 7C:
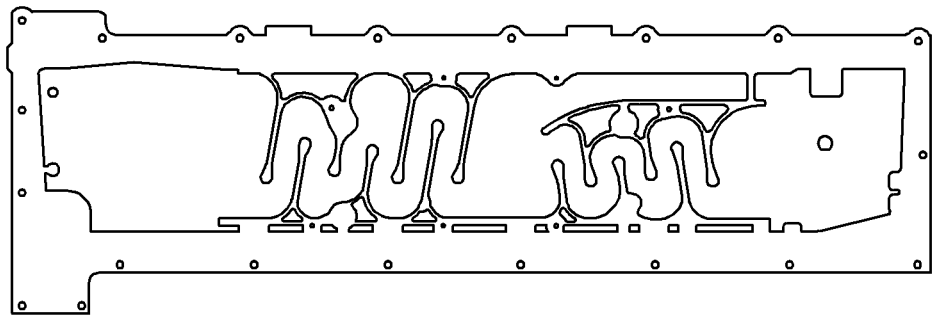
FIG. 7c: shows a plan view of the base plate of an aerosol separator with projections according to generation 5.

FIGS. 7*a-c* show in each case a plan view of a lower part 21 of an aerosol separator, wherein the lower part 21 of FIG. 7*a* is provided with projections 6 of the 2nd generation, the lower part 21 of FIG. 7*b* is provided with projections 6 from the 3rd generation and the lower part 21 of FIG. 7*c* is provided with projections 6 from the 5th generation.

Figure 8A:
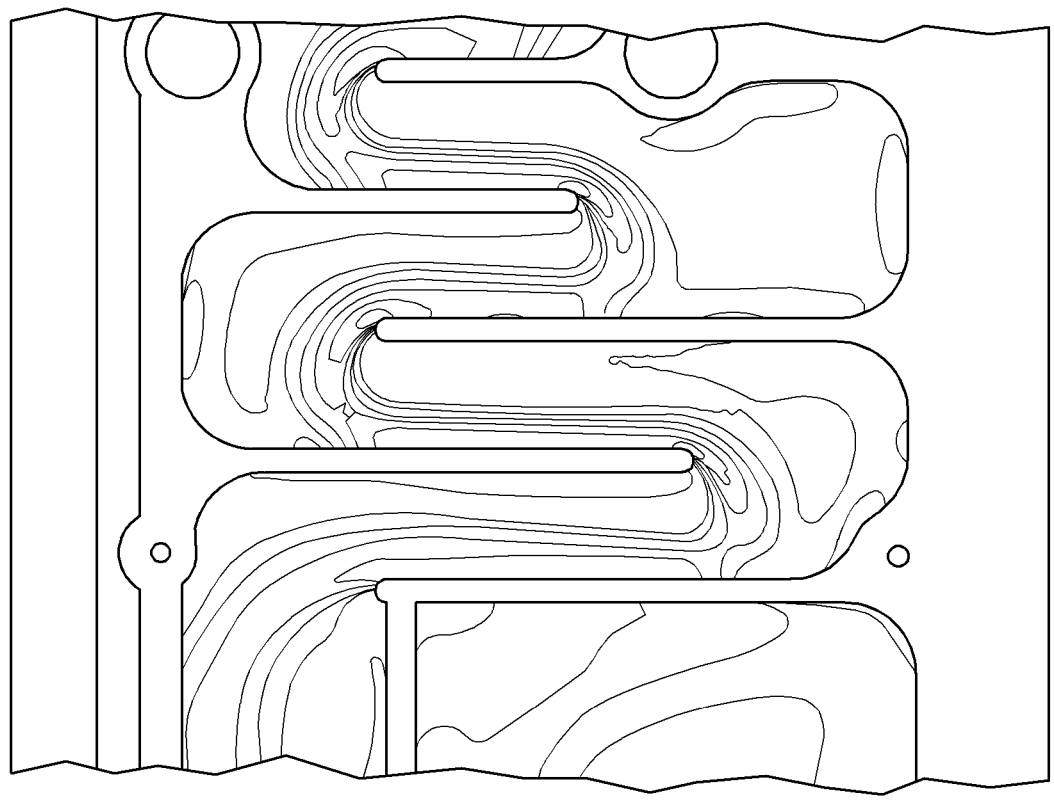
FIG. 8a: shows results of a flow simulation in an aerosol separator with projections according to generation 2.
Figure 8B:
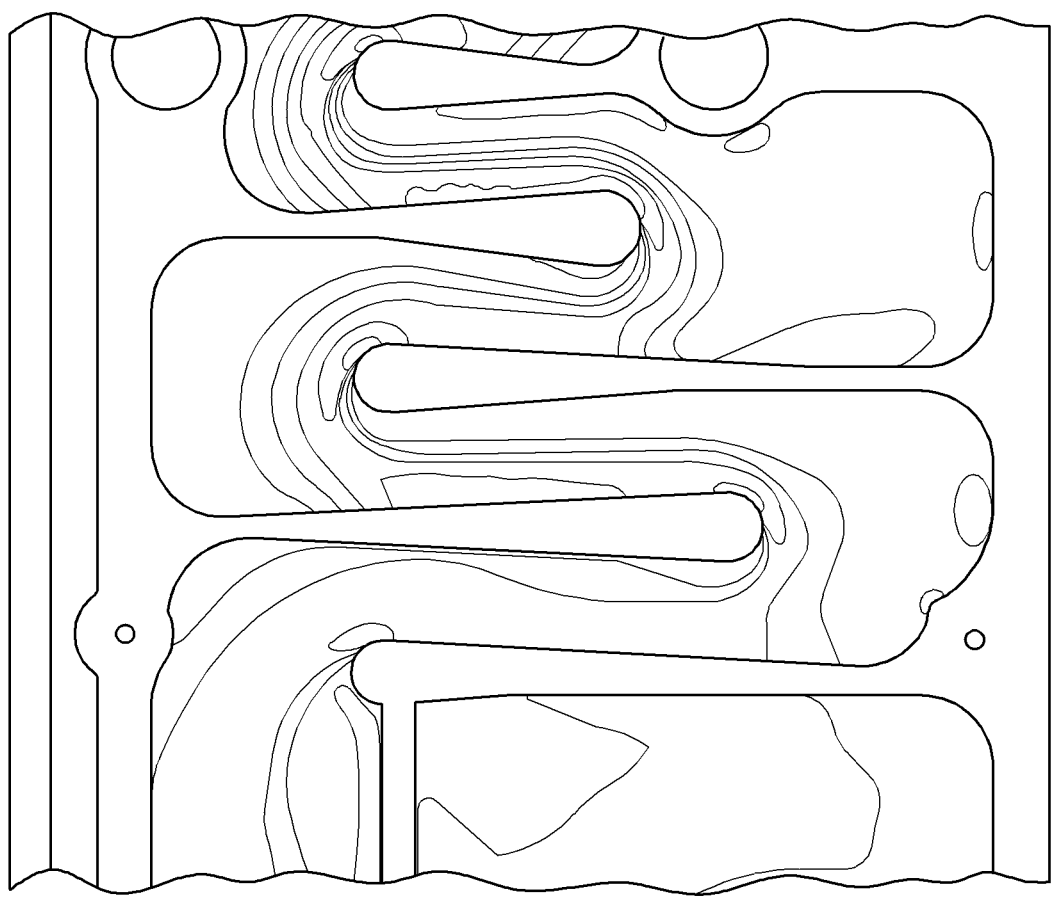
FIG. 8b: shows results of a flow simulation in an aerosol separator with projections according to generation 3

FIGS. 8*a* and 8*b* show in each case for a partial region of the aerosol separator the flow rate of the blow-by gas in the form of plotted contours based on flow simulations. It may be identified that the projections 6 of the 2nd generation lead to the flow rate, after the interruption to the flow at the distal end of a projection 6, being higher than is the case in the projections 6 of the 3rd generation, although the channel width and thus the cross-sectional surface of the flow path of the 3rd generation is smaller. The values provided on the contour lines in the respective figures in this case indicate the speed of the blow-by gas in the unit m/s.

As may be identified in FIGS. 8*b* and 5*a*, for example, the channel width and thus the cross section of the flow paths 5 in the regions between the projection ends and the respectively opposing wall region of the flow path 5 is significantly larger than between the two adjacent projections 6. In large parts of these respective regions the flow of the blow-by gas almost comes to a standstill, which promotes the sinking down of aerosols there, whereas the swirling of aerosols already sinking down or already located on the bottom is prevented.

Figure 8C:
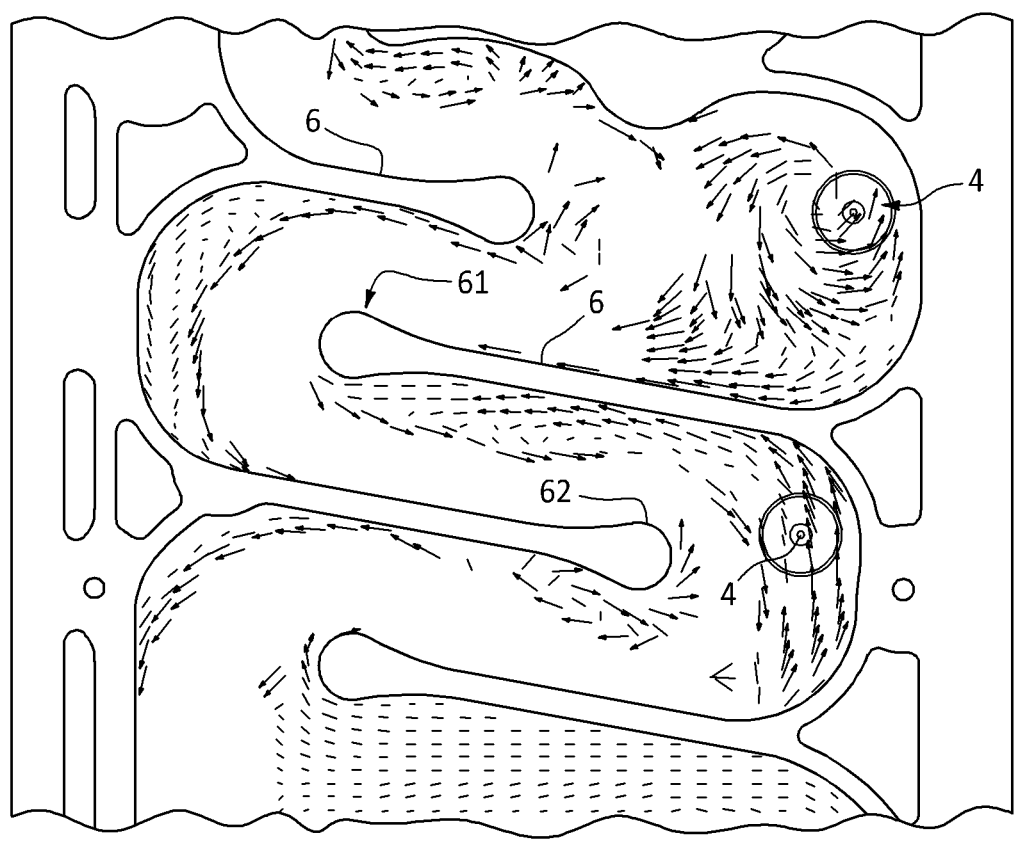
FIG. 8c: shows results of a flow simulation in an aerosol separator with projections according to generation 5.

As may be identified in FIGS. 5*a* and 5*b*, relative to the main direction of flow along the two flow paths 5 the outflow openings 4 arranged along the serpentines are always located upstream of the apex points of the serpentines. Due to their inertia, for the collection of aerosols when flowing into one respective curve there is a substantially smaller adaptation of the direction of flow relative to the resultant of the flow path than is the case for the blow-by gas. This is comparable with a vehicle which travels into a corner at an excessive speed. In the case of unhindered movement, directly before the aerosols reach the wall of the flow paths 5 opposing the projection end, these aerosols are generally entrained due to the flow of blow-by gas there. As a result, it is not uncommon that the direction of flow of the aerosols differs significantly from the direction of flow of pure gases, and in some cases deviates to such an extent that these aerosols may run in opposing directions to one another even on short sections, which ultimately leads to an alteration of the speed of the aerosols. In the vicinity of the outflow opening 4 illustrated and marked in FIG. 8*c*, partial flows coming from different directions coincide, i.e. a vortex is present, whereby a significant suction action is exerted on the aerosols toward the bottom of the aerosol separator. For the purpose of removing aerosols from the blow-by gas and diverting them specifically from the aerosol separator, a positioning of an outflow opening 4 in the center of such a vortex is clearly very advantageous.

FIG. 8*c* shows an implementation with projections 6 from the 5th generation, in which the speed is represented as a vector field.

LIST OF REFERENCE NUMERALS

1 Aerosol separator
2 Feed opening
3 Outlet opening
4 Outflow opening
41 Outflow opening bore
5 Flow path
6 Projection/projections
61 Distal end region of projection
62 Portion with increasing projection width
63 Longitudinal direction of a projection
7 Wide sides of separator basic structure
8 Longitudinal direction of separator
9 Height of flow path in labyrinth
10 Recess in bottom region of separator
11 Non-return valve
12 Cylinder head bank
13 Cylinder head cover
14 Internal combustion engine
15 Combustion chamber
16 Crankcase
17 Compressor
18 Oil trap, 2nd filtering stage
19 Valve train
20 Oil sump
21 Lower part of separator
22 Upper part of separator

The invention claimed is:

1. An aerosol separator (1) for separating aerosols in a blow-by gas, comprising:

at least one feed opening (2) for feeding a blow-by gas provided with aerosols, an outlet opening (3) for discharging a blow-by gas cleaned of aerosols, at least one outflow opening (4) for releasing aerosols removed from the blow-by gas, and which is arranged between a flow path (5) of the at least one feed opening (2) and the outlet opening (3), and a plurality of projections (6) for configuring the flow path (5) running from the at least one feed opening (2) to the outflow opening (4) in a meandering manner, to decelerate the blow-by gas which enters the feed opening (2) and which is provided with aerosols, in terms of its flow rate, wherein at least one outflow opening (4) is arranged in one or more curves of the meandering flow path (5) opposite a respective projection (6) and extending in a direction substantially perpendicular to said protection (6).

2. The aerosol separator (1) as claimed in claim 1, wherein the projections (6) are of rounded shape in their end region (61), and preferably taper toward the end thereof in a droplet shape.

3. The aerosol separator (1) as claimed in claim 1, wherein the plurality of projections (6) in each case have a longitudinal direction (63) running parallel or approximately parallel to one another.

4. The aerosol separator (1) as claimed in claim 2, wherein the end region (61) of one respective projection (6) represents the distal third, preferably quarter, preferably fifth thereof, of the total length of the associated projection (6).

5. The aerosol separator (1) as claimed in claim 1, wherein the plurality of projections (6) are not located perpendicular relative to a resultant of the meandering direction of flow of the flow path (5) and/or a longitudinal direction (8) of the aerosol separator (1), but preferably enclose therewith an acute angle which is preferably between 90° and 45°.

6. The aerosol separator (1) as claimed in claim 1, wherein the aerosol separator (1) has a substantially elongated basic structure and on its two opposing wide sides (7) in each case has a feed opening (2) which in each case lead to an outflow opening (4) arranged in the longitudinal direction (8) of the aerosol separator (1) in the central third, preferably in the central fifth, via a flow path (5) which is configured in a meandering manner by projections (6).

7. The aerosol separator (1) as claimed in claim 6, wherein the two flow paths (5) leading from opposing wide sides (7) to the outflow opening (4) in each case have a plurality of projections (6), each of the two flow paths (5) has a plurality of projections (6), the longitudinal directions (63) thereof running parallel or approximately parallel to one another, and the projections (6) of the two flow paths (5) are not oriented approximately parallel to one another but enclose an angle in the range of 40°-15°, preferably 35°-25°.

8. The aerosol separator (1) as claimed in claim 1, wherein parts of the space or the entire space through which the blow-by gas flows in the aerosol separator (1) is delimited by a surface without edges, preferably with tangential continuity.

9. The aerosol separator (1) as claimed in claim 1, wherein parts of the space or the entire space through which the blow-by gas flows in the aerosol separator (1) is delimited by a surface which has a rough surface in order to promote the adhesion of aerosols, wherein preferably the projections (6) are provided with a rough surface.

10. The aerosol separator (1) as claimed in claim 1, wherein the flow path (5) which is configured in a meandering manner by the projections (6) from the feed opening (2) to the outflow opening (4) has a height (9) which is approximately constant, i.e. decreases from a maximum height by less than 10%, preferably by less than 5%.

11. The aerosol separator (1) as claimed in claim 1, wherein the aerosol separator (1) is inclined about the axis of its longitudinal extent, and the outflow opening (4) or a plurality of outflow openings (4) is and/or are arranged in a deeper region of the obliquely positioned aerosol separator (1), to promote an inflow of collected aerosols flowing on a bottom region, and/or at least one outflow opening (4) is arranged downstream of the flow path (5) which is shaped in a meandering manner and alternatively or additionally, at least one outflow opening (4) is arranged in a serpentine of the meandering flow path (5).

12. The aerosol separator (1) as claimed in claim 1, wherein the at least one outflow opening (4) is arranged in an apex region of the flow path (5) which is configured in a meandering manner and/or is arranged downstream of the meandering flow path (5) just upstream of the outlet opening (3), and/or the at least one outflow opening (4) is arranged in a recess (10) provided for the remainder of the flow path (5) from the feed opening (2) to the outlet opening (3), and/or the at least one outflow opening (4) is arranged in a region of the flow path (5) which has a particularly low flow rate of a blow-by gas flowing through the aerosol separator (1), i.e. it has a flow rate which belongs to the slowest third, preferably the slowest quarter, preferably the slowest fifth of the flow rates, and/or the at least one outflow opening (4) is arranged in a region of the aerosol separator (1) in which partial flows coming locally from different directions coincide, and/or the at least one outflow opening (4) is arranged in a bottom region of the aerosol separator (1).

13. The aerosol separator (1) as claimed in claim 1, wherein at least one non-return valve (11) which covers one respective outflow opening (4) is provided to prevent the aerosols, which are actually flowing away, from flowing back into the aerosol separator (1) counter to the originally provided outflow direction.

14. The aerosol separator (1) as claimed in claim 1, wherein an outflow opening (4) may comprise a plurality of openings, in particular bores (41) in a base plate of the aerosol separator (1) which are all covered by a common non-return valve (11).

15. The aerosol separator (1) as claimed in claim 1, wherein the projections (6) in their end region (61), around which blow-by gas flows, have a portion with increasing projection width (62).

16. The aerosol separator (1) as claimed in claim 1, wherein more than 50%, preferred more than 60% and especially preferred more than 70%, of the flow path (5) between the at least one feed opening (2) and the outlet opening (3) is formed in the meandering manner.

17. The aerosol separator (1) as claimed in claim 1, wherein the separator is configured such that blow-by gas getting inside the separator via the at least one feed opening (2) must necessarily pass through at least one meandering flow path (5).

18. The aerosol separator (1) as claimed in claim 1, wherein each of the meandering flow paths (5) comprise at least two projections (6) for deflecting the passing flow in a meandering manner, preferably at least three projections (6), particularly preferably at least four projections (6) and the blow-by-gas entering the aerosol separator (1) through the at least one feed opening (2) passes at least one of the meandering flow paths before exiting the separator via the outlet opening (3).

19. An internal combustion engine (14) having an aerosol separator (1) for separating aerosols in a blow-by gas as claimed in claim 1, wherein preferably the aerosol separator (1) is arranged above the cylinder head bank (12) and/or is located below the cylinder head cover (13).

20. The aerosol separator (1) as claimed in claim 1, comprising a plurality of curves, with a projection (6) and an outflow opening (4) arranged between said plurality of curves.

21. An aerosol separator (1) for separating aerosols in a blow-by gas, comprising:
at least one feed opening (2) for feeding a blow-by gas provided with aerosols,
an outlet opening (3) for discharging a blow-by gas cleaned of aerosols,
at least one outflow opening (4) for releasing aerosols removed from the blow-by gas, and which is arranged between a flow path (5) of the at least one feed opening (2) and the outlet opening (3), and
a plurality of projections (6) for configuring the flow path (5) running from the at least one feed opening (2) to the outflow opening (4) in a meandering manner, to decelerate the blow-by gas which enters the feed opening (2) and which is provided with aerosols, in terms of its flow rate,
wherein at least one outflow opening (4) is arranged between a plurality of curves of the meandering flow path (5).

22. The aerosol separator (1) as claimed in claim 21, wherein the meandering flow path (5) extends in a straight plane from one end to another.

23. The aerosol separator (1) as claimed in claim 22, wherein the meandering flow path (5) extends obliquely to a horizontal plane.

24. The aerosol separator (1) as claimed in claim 21, wherein the meandering flow path (5) has a height which is substantially constant.

25. The aerosol separator (1) as claimed in claim 21, comprising two said flow paths (5) each meandering inwardly from a respective feed opening (2) at opposite sides (7) of the aerosol separator (1).

* * * * *